US006640294B2

United States Patent
Debiez et al.

(10) Patent No.: US 6,640,294 B2
(45) Date of Patent: Oct. 28, 2003

(54) DATA INTEGRITY CHECK METHOD USING CUMULATIVE HASH FUNCTION

(75) Inventors: Jacques Debiez, Cugnaux (FR); James P. Hughes, Lino Lakes, MN (US); Axelle Apvrille, Toulouse (FR)

(73) Assignee: Storage Technology Corporation, Louisville, CO (US)

(*) Notice: Subject to any disclaimer, the term of this patent is extended or adjusted under 35 U.S.C. 154(b) by 54 days.

(21) Appl. No.: 10/034,706

(22) Filed: Dec. 27, 2001

(65) Prior Publication Data

US 2003/0126400 A1 Jul. 3, 2003

(51) Int. Cl.[7] .............................................. G06F 12/08
(52) U.S. Cl. ....................................................... 711/216
(58) Field of Search ......................................... 711/216

(56) References Cited

U.S. PATENT DOCUMENTS

2001/0027450 A1 * 10/2001 Shinoda et al. ................. 707/1

* cited by examiner

*Primary Examiner*—Reginald G. Bragdon
*Assistant Examiner*—Midys Inoa
(74) *Attorney, Agent, or Firm*—Brooks & Kushman P.C.

(57) ABSTRACT

Data integrity checking methods utilize a cumulative hash function. A sequence of data blocks and a corresponding sequence of hashes are stored on a medium. Each hash in the sequence of hashes corresponds to a data block in the sequence of data blocks. A particular hash corresponding to a particular data block is determined as a function of the particular data block and at least one previous hash corresponding to a previous data block in the sequence of data blocks.

12 Claims, 2 Drawing Sheets

DATA INTEGRITY CHECK METHOD USING CUMULATIVE HASH FUNCTION

BACKGROUND OF THE INVENTION

1. Field of the Invention

The present invention relates to data integrity check methods and to hash functions.

2. Background Art

Typical storage media including, for example, storage tapes, do not have any security features built in. Data may be written on the media, data may be erased from the media, and data may be overwritten with other data. A first step toward increasing data security for storage media is providing a data integrity check method. Data integrity is the ability to prove that written data is intact, that is, has not been tampered with or modified by anyone.

In the security field, data integrity is often achieved with the use of a hash function. A hash function is a transformation that transforms an input to a fixed size string. Hash functions have a number of general uses. A cryptographic hash function is used in the security field to achieve data integrity. A cryptographic hash function is a one-way function that digests input data and has very few collisions. A one-way function is a function that is very difficult to invert. That is, data can be processed through the one-way hash function to get a result, but it is very difficult to reverse the function and obtain the data with the result. A cryptographic hash function digests input data in that the output is much smaller in size than the input data. For example, many pages of text may be digested by a cryptographic hash function to produce a 20 byte hash. In addition, a cryptographic hash function has very few collisions in that two different initial texts have very little chance of producing the same hash.

The capabilities of the cryptographic hash function are commonly used to provide data integrity. An existing data integrity check method using a cryptographic hash function involves the following. First, a data block or sequence of data blocks is received. The data is hashed using a cryptographic hash function or hash algorithm. The data and the hash are both stored (the hash is small compared to the data because the cryptographic hash function digests the data). To conduct the data integrity check, the data and the hash are retrieved from the storage medium. The data is then hashed using the hash function, and the obtained hash is compared with the stored hash that was retrieved from the storage medium. If both the originally stored hash and the recalculated hash are the same, then the data is considered authentic, that is, the data has not been modified. If the data had been replaced with some other data, then the hash of the other data that is calculated when the data is retrieved would not correspond to the original stored hash that was calculated when the data was stored. This existing process is useful in many applications because the process allows detection of modified data by comparing two hashes. However, although this process has been used in many successful applications, this existing process does have a limitation. The existing process cannot authenticate the data if the hash has been modified. The existing process cannot authenticate the data if the hash and data have both been modified and the new hash is different than the hash of the new data. And, the existing process cannot detect an error if both the data and the hash are replaced with new data and a hash of only the new data. That is, when the data and the hash are retrieved, computing the hash of the retrieved data would result in a computed hash matching the retrieved hash because the data and the hash were modified.

For the foregoing reasons, there is a need for a data integrity check method that can detect modifications to data even if the data and the associated hash are both replaced with new data and a hash of only the new data.

SUMMARY OF THE INVENTION

It is therefore an object of the present invention to provide a data integrity check method using a cumulative hash function that allows detection of data modification when a block of data and associated hash are both replaced.

In carrying out the above object, a method of writing a sequence of data blocks to a storage medium is provided. The method comprises receiving the sequence of data blocks, determining a sequence of hashes corresponding to the sequence of data blocks, and storing the sequence of data blocks and corresponding sequence of hashes on the storage medium. Each hash in the sequence of hashes corresponds to a data block in the sequence of data blocks. A particular hash corresponding to a particular data block is determined as a function of the particular data block and at least one previous hash corresponding to a previous data block in the sequence of data blocks.

In one embodiment, a particular hash corresponding to a particular data block is determined as a function of the particular data block and an immediately previous hash corresponding to an immediately previous data block in the sequence of data blocks. In a preferred embodiment, a particular hash corresponding to a particular data block is determined according to:

$H_1$=hash $(D_1)$; and $H_i$=hash $(H_{i-1}, D_i)$, i=2, 3, 4, . . . ;

where:

$D_n$ is the n-th data block in the sequence of data blocks, n=1, 2, 3, . . . ;

$H_n$ is the n-th hash in the sequence of hashes, n=1, 2, 3, . . . ; and hash ( ) is a hashing function.

It is appreciated that the present invention provides a cumulative hash function in that a particular hash corresponding to a particular data block is determined as a function of the particular data block and at least one previous hash corresponding to a previous data block in the sequence of data blocks. The at least one previous hash may be an immediately previous hash or any other previous hash, or a number of different previous hashes. In addition, one specific example of a way to determine the hash is given above.

Further, in carrying out the present invention, a method of reading a sequence of data blocks and a corresponding sequence of original hashes from a storage medium is provided. The method comprises receiving the sequence of data blocks and the corresponding sequence of original hashes. A sequence of recalculated hashes corresponding to the sequence of data blocks is determined. Each recalculated hash in the sequence of recalculated hashes corresponds to a data block in the sequence of data blocks. A particular recalculated hash corresponding to a particular data block is determined as a function of the particular data block and at least one previous recalculated hash corresponding to a previous data block in the sequence of data blocks. The method further comprises comparing the sequence of recalculated hashes and the sequence of original hashes to detect any errors in the sequence of data blocks.

Further, in carrying out the present invention, a data storage medium is provided. The data storage medium has a sequence of data blocks and a corresponding sequence of hashes stored on the medium. Each hash in the sequence of hashes corresponds to a data block in the sequence of data blocks. A particular hash corresponding to a particular data block is determined as a function of the particular data block and at least one previous hash corresponding to a previous data block in the sequence of data blocks.

Still further, in carrying out the present invention, a medium having instructions stored thereon is provided. The instructions are executable by a processor to process a sequence of data blocks and determine a corresponding sequence of hashes. Each hash in the sequence of hashes corresponds to a data block in the sequence of data blocks. A particular hash corresponding to a particular data block is determined as a function of the particular data block and at least one previous hash corresponding to a previous data block in the sequence of data blocks.

It is appreciated that in the various ways for carrying out the invention, the hash function may be implemented in a number of different ways. Some exemplary hash function embodiments are described above.

The advantages associated with the embodiments of the present invention are numerous. For example, embodiments of the present invention utilize a cumulative hash function in that a particular hash corresponding to a particular data block is determined as a function of the particular data block and at least one previous hash corresponding to a previous data block in the sequence of data blocks. Because the hash is cumulative, it is possible to detect when both a block of data and the corresponding hash have been replaced on the storage medium when the replacement hash and all following hashes are not determined using the specific cumulative hash function used during the original writing of the data. Further, if there is an accidental error, attempts to recover the lost data can be made and the cumulative hash can be used to verify the recovered data.

The above object and other objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
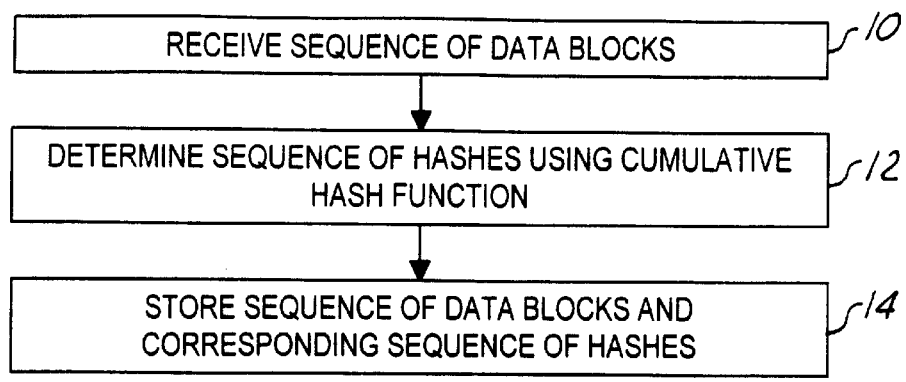
FIG. 1 is a block diagram illustrating a method of writing a sequence of data blocks to a storage medium in accordance with the present invention.

Embodiments of the present invention utilize a cumulative hash function for performing a data integrity check. The present invention could be applied to any security system that needs to perform data integrity and detect possible errors. In FIG. 1, a method of writing a sequence of data blocks to a storage medium is illustrated. At block 10, the sequence of data blocks is received. A data block is a chunk of data that is being processed all at once. At block 12, a sequence of hashes corresponding to the sequence of data blocks is determined. Each hash in the sequence of hashes corresponds to a data block in the sequence of data blocks. A particular hash corresponding to a particular data block is determined as a function of the particular data block and at least one previous hash corresponding to a previous data block in the sequence of data blocks. That is, the hash function is cumulative in that it depends on previous calculations of the hash function. At block 14, the sequence of data blocks and corresponding sequence of hashes are stored on the storage medium.

Figure 2:
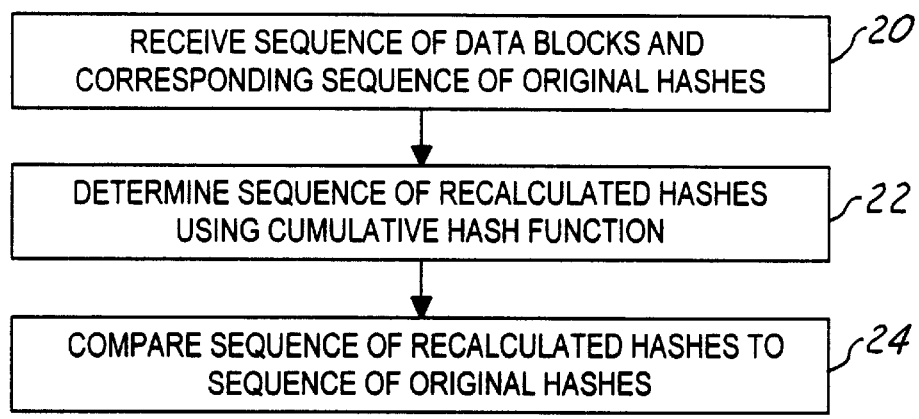
FIG. 2 is a block diagram illustrating a method of reading a sequence of data blocks and a corresponding sequence of original hashes from a storage medium in accordance with the present invention.

FIG. 2 illustrates a method of reading a sequence of data blocks and a corresponding sequence of original hashes from a storage medium. At block 20, the sequence of data blocks and the corresponding sequence of original hashes are received. At block 22, a sequence of recalculated hashes corresponding to the sequence of data blocks is determined. Each recalculated hash in the sequence of recalculated hashes corresponds to a data block in the sequence of data blocks. A particular recalculated hash corresponding to a particular data block is determined as a function of the particular data block and at least one previous recalculated hash corresponding to a previous data block in the sequence of data blocks. At block 24, the sequence of recalculated hashes and the sequence of original hashes are compared to detect any errors in the sequence of data blocks.

The methods of reading and writing described with reference to FIGS. 1 and 2 utilize a cumulative hash function of the present invention. The cumulative hash function has many embodiments. For example, a particular hash corresponding to a particular data block may be determined as a function of the particular data block and an immediately previous hash corresponding to an immediately previous data block in the sequence of data blocks. Alternatively, the particular hash would be determined as a function of the particular data block and any one or more previous hashes corresponding to the previous data blocks in the sequence of data blocks. For example, a particular hash corresponding to a particular data block may be determined according to:

$H_1$=hash ($D_1$); and $H_i$=hash ($H_{i-1}$, $D_i$), i=2, 3, 4, . . . ;

where:

$D_n$ is the n-th data block in the sequence of data blocks, n=1, 2, 3, . . . ;

$H_n$ is the n-th hash in the sequence of hashes, n=1, 2, 3, . . . ; and hash ( ) is a hashing function.

Figure 3:
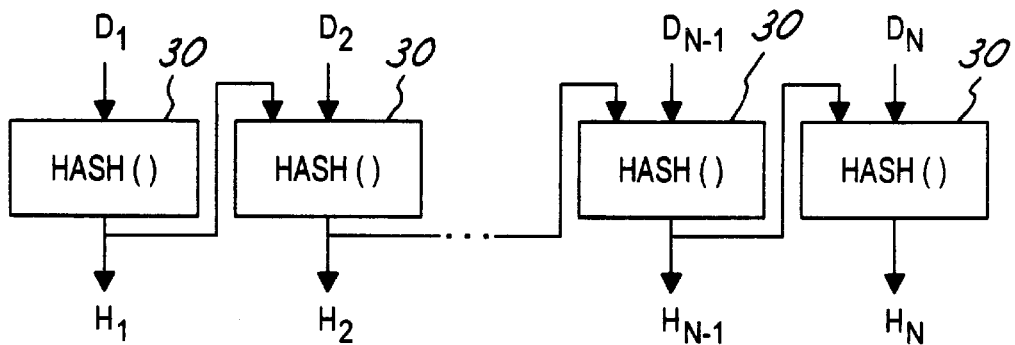
FIG. 3 illustrates an example of a cumulative hash function of the present invention.

This specific example of a cumulative hash function for use in preferred embodiments of the present invention is illustrated in FIG. 3. The hash function is indicated at 30. As shown, each hash value is determined in accordance with the equations given above. That is, the first hash value results from the hashing of the first data block. All subsequent hash values result from the hashing of the immediate previous hash and the current data block.

Figure 4:
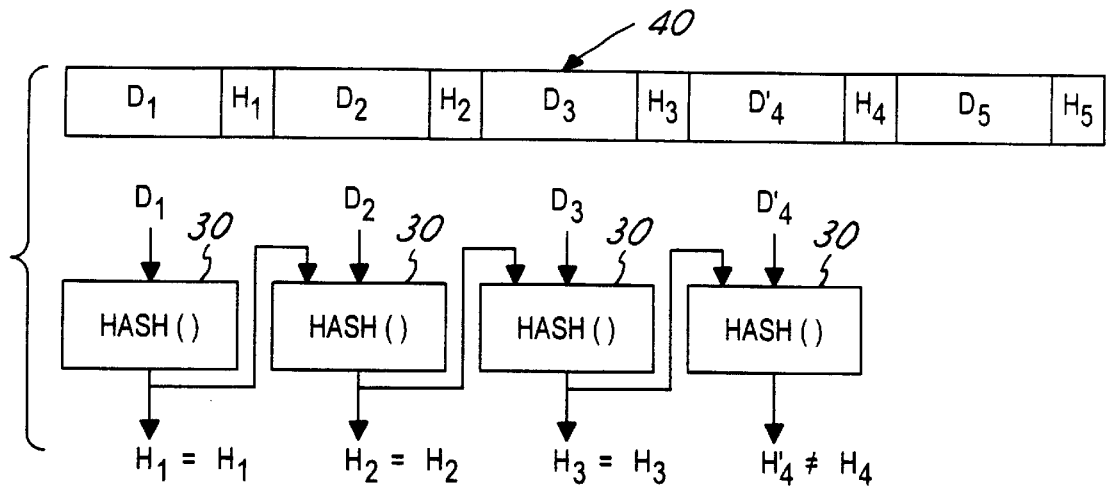
FIG. 4 illustrates an example of error detection.
Figure 5:
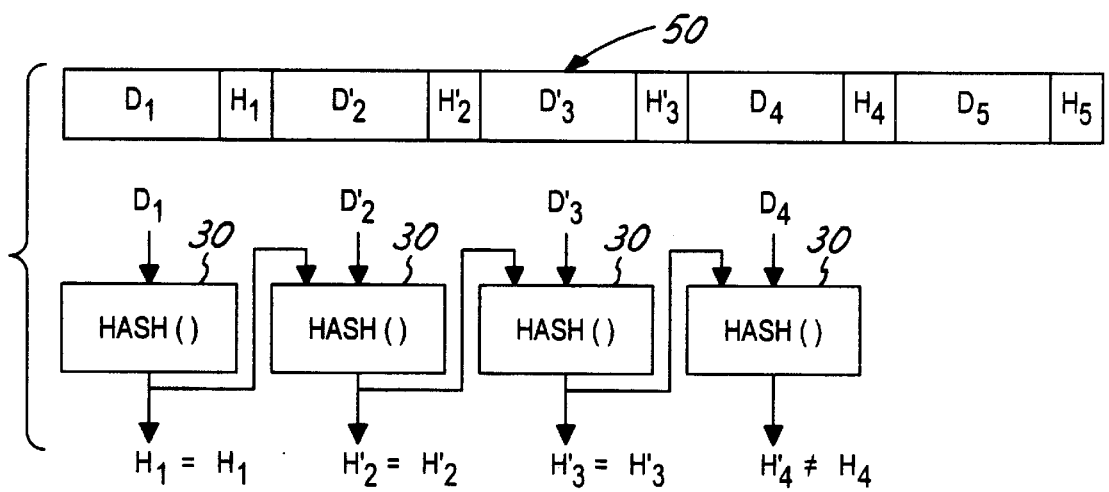
FIG. 5 illustrates another example of error detection.

FIGS. 4 and 5 illustrate two examples of error detection using the hash function embodiment of FIG. 3. In these illustrations, originally stored data are indicated by $D_n$, modified stored data are indicated by $D'_n$, originally stored hashes are indicated by $H_n$, and modified stored hashes are indicated by $H'_n$. In FIG. 4, a data storage medium is generally indicated at 40, and the hash function is indicated at 30. Storage medium 40 stores a sequence of data blocks and a corresponding sequence of hashes. As shown, the integrity of the data storage medium has been compromised in that $D_4$ has been modified and changed to $D'_4$.

During the verification process, data block $D_1$ is read and hashed. The recalculated hash $H_1$ is equal to the stored hash $H_1$. Similarly, $D_2$ is read, and the hash function recalculates the hash based on data block $D_2$ and previous hash $H_1$, resulting in a recalculated hash of $H_2$ equal to stored hash $H_2$. The reading of the data blocks and determination of the recalculated hashes continues with each recalculated hash being compared to the stored hash. The first three recalculated hashes match the appropriate stored hashes. When the fourth data block $D'_4$ is read, and hashed (with $H_3$), the recalculated hash $H'_4$ is not equal to the stored hash $H_4$. This indicates that there is an error in $H_j$ or $D_j$, $1 \leq j \leq 4$ (the "or" is non-exclusive).

Another example of error detection is illustrated in FIG. 5. The data storage medium having a sequence of stored data blocks and corresponding sequence of stored hashes is generally indicated at 50. During the verification process, data block $D_1$ is read and hashed, producing recalculated hash $H_1$, which matches stored hash $H_1$. $D'_2$ is then read and recalculated hash $H'_2$ is produced. $D'_2$ is corrupted data, however, the stored hash has been modified to $H'_2$ and as such no error is detected at this point. On the medium, the third data block and hash have also been modified to $D'_3$ and $H'_3$, respectively. As such, reading and hash recalculation continues with the reading of $D'_3$, and the calculation of recalculated hash $H'_3$ which is then compared to stored hash $H'_3$ (actually the originally stored hash was $H_3$, but has been modified to $H'_3$ so that no error is detected at this point). However, upon reaching the end of the modified data, data block $D_4$ is read and hashed (with recalculated hash $H'_3$) producing recalculated hash $H'_4$. At this point, an error is detected because the stored hash $H_4$ does not match the recalculated hash $H'_4$. It can be concluded that there is an error in $H_j$ or $D_j$, $1 < j < 4$.

It is appreciated that the hash function example shown in FIG. 3 and used in the error detection examples of FIGS. 4 and 5 is a preferred embodiment. Other embodiments of a cumulative hash function may be utilized in accordance with the present invention as readily appreciated by one of ordinary skill in the art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of writing a sequence of data blocks to a storage medium, the method comprising:

receiving the sequence of data blocks;

determining a sequence of hashes corresponding to the sequence of data blocks, each hash in the sequence of hashes corresponding to a data block in the sequence of data blocks, wherein a particular hash corresponding to a particular data block is determined as a function of the particular data block and at least one previous hash corresponding to a previous data block in the sequence of data blocks; and storing the sequence of data blocks and corresponding sequence of hashes on the storage medium.

2. The method of claim 1 wherein a particular hash corresponding to a particular data block is determined as a function of the particular data block and an immediately previous hash corresponding to an immediately previous data block in the sequence of data blocks.

3. The method of claim 2 wherein a particular hash corresponding to a particular data block is determined according to:

$H_1$=hash $(D_1)$; and $H_i$=hash $(H_{i-1}, D_i)$, i=2, 3, 4, . . . ;

where:

$D_n$ is the n-th data block in the sequence of data blocks, n=1, 2, 3, . . . ;

$H_n$ is the n-th hash in the sequence of hashes, n=1, 2, 3, . . . ; and hash ( ) is a hashing function.

4. A method of reading a sequence of data blocks and a corresponding sequence of original hashes from a storage medium, the method comprising:

receiving the sequence of data blocks and the corresponding sequence of original hashes;

determining a sequence of recalculated hashes corresponding to the sequence of data blocks, each recalculated hash in the sequence of recalculated hashes corresponding to a data block in the sequence of data blocks, wherein a particular recalculated hash corresponding to a particular data block is determined as a function of the particular data block and at least one previous recalculated hash corresponding to a previous data block in the sequence of data blocks; and comparing the sequence of recalculated hashes and the sequence of original hashes to detect any errors in the sequence of data blocks.

5. The method of claim 4 wherein a particular recalculated hash corresponding to a particular data block is determined as a function of the particular data block and an immediately previous recalculated hash corresponding to an immediately previous data block in the sequence of data blocks.

6. The method of claim 5 wherein a particular recalculated hash corresponding to a particular data block is determined according to:

$H_1$=hash $(D_1)$; and $H_i$=hash $(H_{i-1}, D_i)$, i=2, 3, 4, . . . ;

where:

$D_n$ is the n-th data block in the sequence of data blocks, n=1, 2, 3, . . . ;

$H_n$ is the n-th recalculated hash in the sequence of recalculated hashes, n=1, 2, 3, . . . ; and hash ( ) is a hashing function.

7. A data storage medium having a sequence of data blocks and a corresponding sequence of hashes stored on the medium, each hash in the sequence of hashes corresponding to a data block in the sequence of data blocks, wherein a particular hash corresponding to a particular data block is determined as a function of the particular data block and at least one previous hash corresponding to a previous data block in the sequence of data blocks.

8. The data storage medium of claim 7 wherein a particular hash corresponding to a particular data block is determined as a function of the particular data block and an immediately previous hash corresponding to an immediately previous data block in the sequence of data blocks.

9. The data storage medium of claim 8 wherein a particular hash corresponding to a particular data block is determined according to:

$H_1$=hash $(D_1)$; and $H_i$=hash $(H_{i-1}, D_i)$, i=2, 3, 4, . . . ;

where:

$D_n$ is the n-th data block in the sequence of data blocks, n=1, 2, 3, . . . ;

$H_n$ is the n-th hash in the sequence of hashes, n=1, 2, 3, . . . ; and hash ( ) is a hashing function.

10. A medium having instructions stored thereon, the instructions being executable by a processor to process a sequence of data blocks and determine a corresponding sequence of hashes, each hash in the sequence of hashes corresponding to a data block in the sequence of data blocks, wherein a particular hash corresponding to a particular data block is determined as a function of the particular data block and at least one previous hash corresponding to a previous data block in the sequence of data blocks.

11. The medium of claim 10 wherein a particular hash corresponding to a particular data block is determined as a function of the particular data block and an immediately previous hash corresponding to an immediately previous data block in the sequence of data blocks.

12. The medium of claim 11 wherein a particular hash corresponding to a particular data block is determined according to:

$H_1$=hash ($D_1$); and $H_i$=hash ($H_{i-1}$, $D_i$), i=2, 3, 4, . . . ;

where:

$D_n$ is the n-th data block in the sequence of data blocks, n=1, 2, 3, . . . ;

$H_n$ is the n-th hash in the sequence of hashes, n=1, 2, 3, . . . ; and hash ( ) is a hashing function.

\* \* \* \* \*